United States Patent
Daniels

(10) Patent No.: US 6,622,421 B1
(45) Date of Patent: Sep. 23, 2003

(54) TIP DOWN ICE FISHING APPARATUS

(76) Inventor: Steve Daniels, 811 S. 48th Ave., Apt. 11, Wausau, WI (US) 54401

( * ) Notice: Subject to any disclaimer, the term of this patent is extended or adjusted under 35 U.S.C. 154(b) by 4 days.

(21) Appl. No.: 09/909,305

(22) Filed: Jul. 19, 2001

(51) Int. Cl.[7] .................... A01K 97/10; A01K 97/08
(52) U.S. Cl. .................... 43/45; 43/21.2; 43/26
(58) Field of Search .................... 43/4.5, 21.2, 17.5, 43/26; 248/525, 528, 529

(56) References Cited

U.S. PATENT DOCUMENTS

| | | | |
|---|---|---|---|
| 1,020,044 A | * 3/1912 | McGuire | 43/26 |
| 2,430,810 A | * 11/1947 | Westfall | 248/525 |
| 2,839,865 A | * 6/1958 | Lubanski | 43/26 |
| 3,515,263 A | 6/1970 | Carlson | |
| 4,016,670 A | 4/1977 | Pihlaja et al. | |
| 4,030,223 A | 6/1977 | Loesch et al. | |
| 4,133,131 A | * 1/1979 | Davy | 43/26 |
| 4,550,520 A | * 11/1985 | Bogue | 43/21.2 |
| 4,620,387 A | 11/1986 | Bloom | |
| 4,628,628 A | * 12/1986 | Burgin | 43/26 |
| 4,642,931 A | * 2/1987 | Flores | 43/21.2 |
| 4,694,603 A | 9/1987 | Anderson | |
| 4,700,502 A | * 10/1987 | McFarland | 43/21.2 |
| 4,750,286 A | 6/1988 | Gray | |
| 4,915,332 A | * 4/1990 | Ouellette | 248/528 |
| 4,949,498 A | 8/1990 | Cecchetti | |
| 5,050,333 A | 9/1991 | Debreczeni | |
| 5,163,243 A | 11/1992 | Wold, Jr. et al. | |
| 5,345,708 A | 9/1994 | Loyd | |
| 5,357,410 A | * 10/1994 | Cota | 43/17.5 |
| 5,488,798 A | * 2/1996 | Beachel | 43/21.2 |
| 5,992,080 A | 11/1999 | Allen | |
| 6,062,382 A | 5/2000 | Czerkie | |
| 6,079,142 A | 6/2000 | Danser et al. | |
| 6,094,852 A | 8/2000 | Roach | |
| 6,155,001 A | 12/2000 | Marin | |

* cited by examiner

Primary Examiner—Kurt Rowan
(74) Attorney, Agent, or Firm—Andrus, Sceales, Starke & Sawall, LLP

(57) ABSTRACT

A self-contained fishing system includes a telescopic, tubular fishing rod holder and support tower having an extendable and retractable upper end for pivotally supporting a fishing rod therefrom. A cavity is sized to contain the fishing rod in an assembled condition and a set of movable legs in a retractable condition. A closure device is removably fastened to an open, lower end thereof for supporting the fishing rod and the movable legs in a storage mode within the cavity. To define a fishing mode, with the upper end extended and the closure device detached, the fishing rod is removed from the cavity and pivotally supported on the upper end. The legs are removed from the cavity, folded into an extended condition adapted to engage a support surface and the closure device is replaced such that the legs support the fishing rod holder and tower.

13 Claims, 5 Drawing Sheets

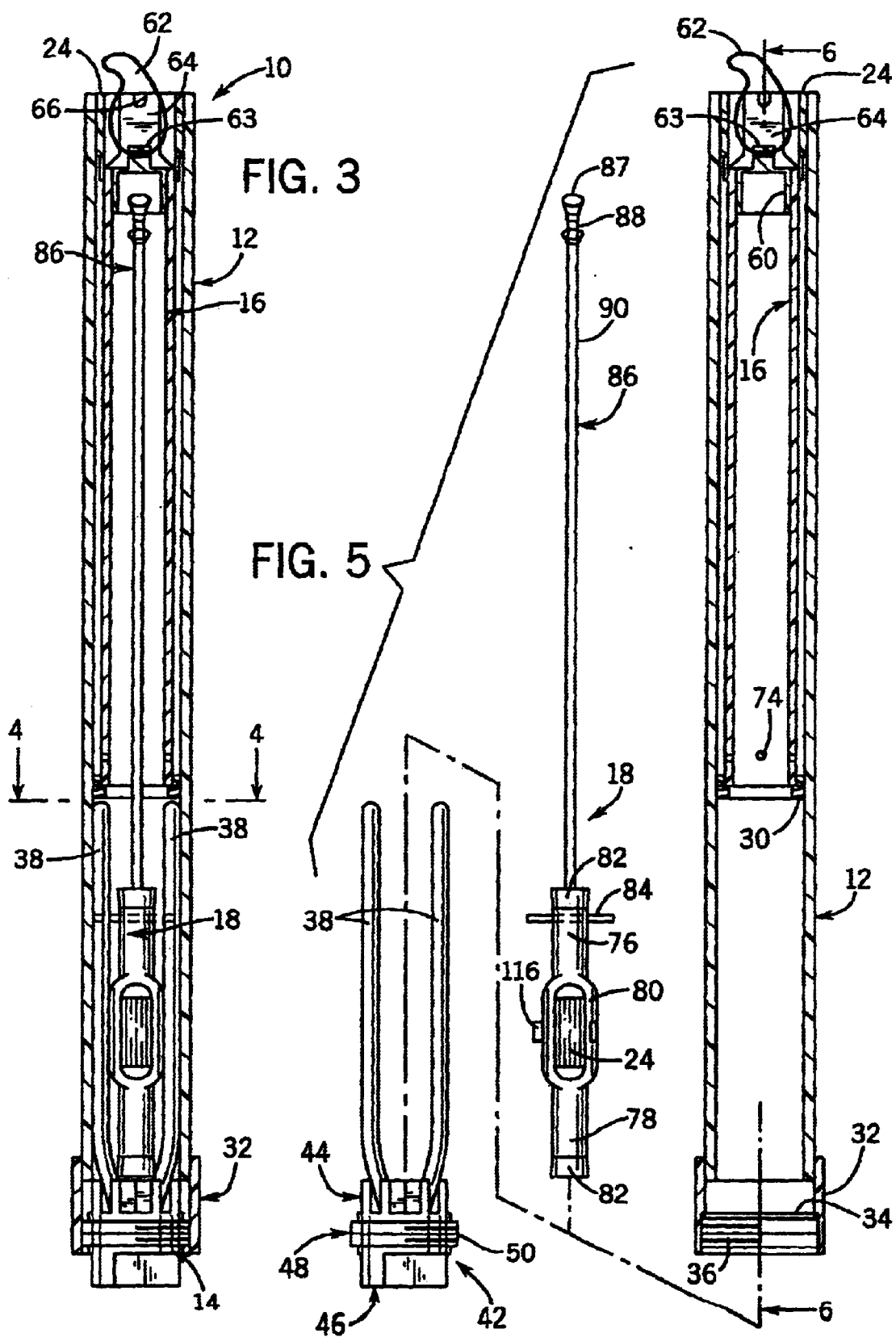

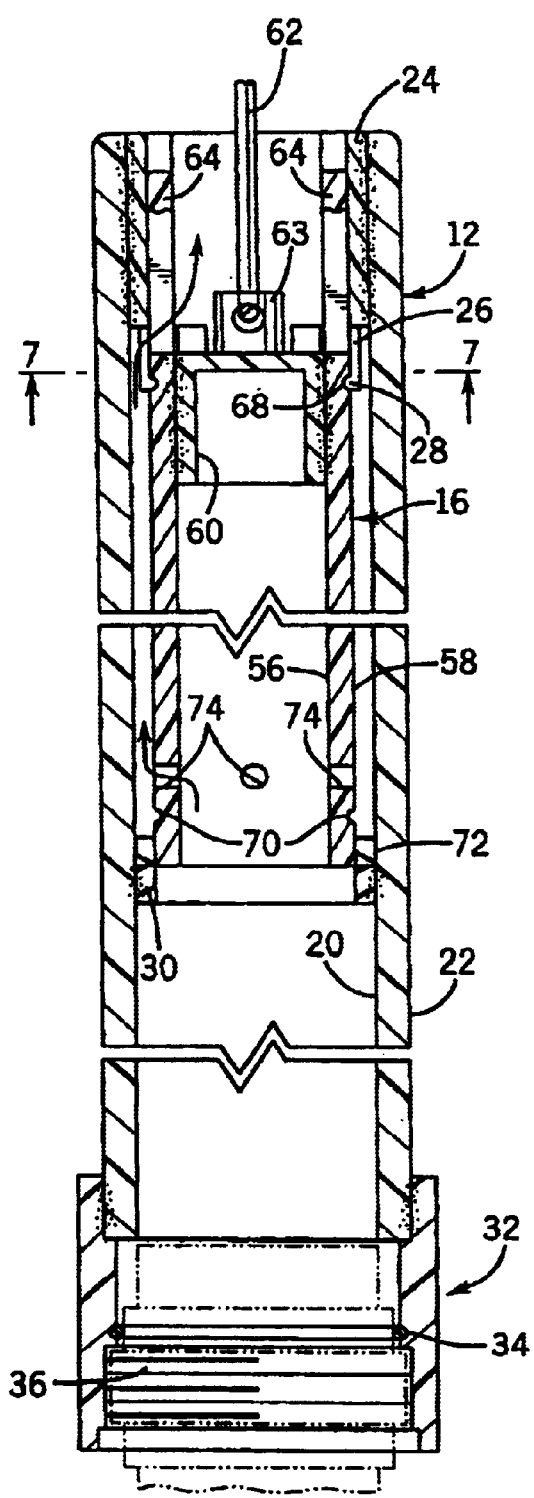
FIG. 6
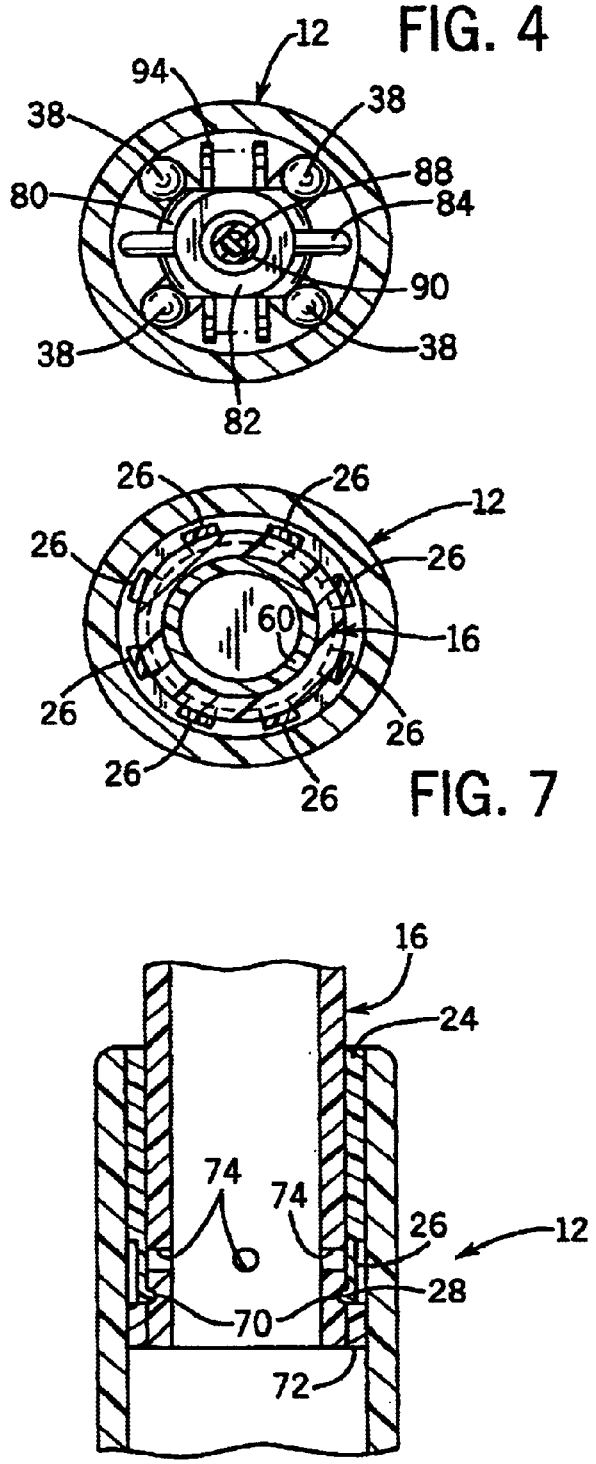
FIG. 4
FIG. 7
FIG. 9

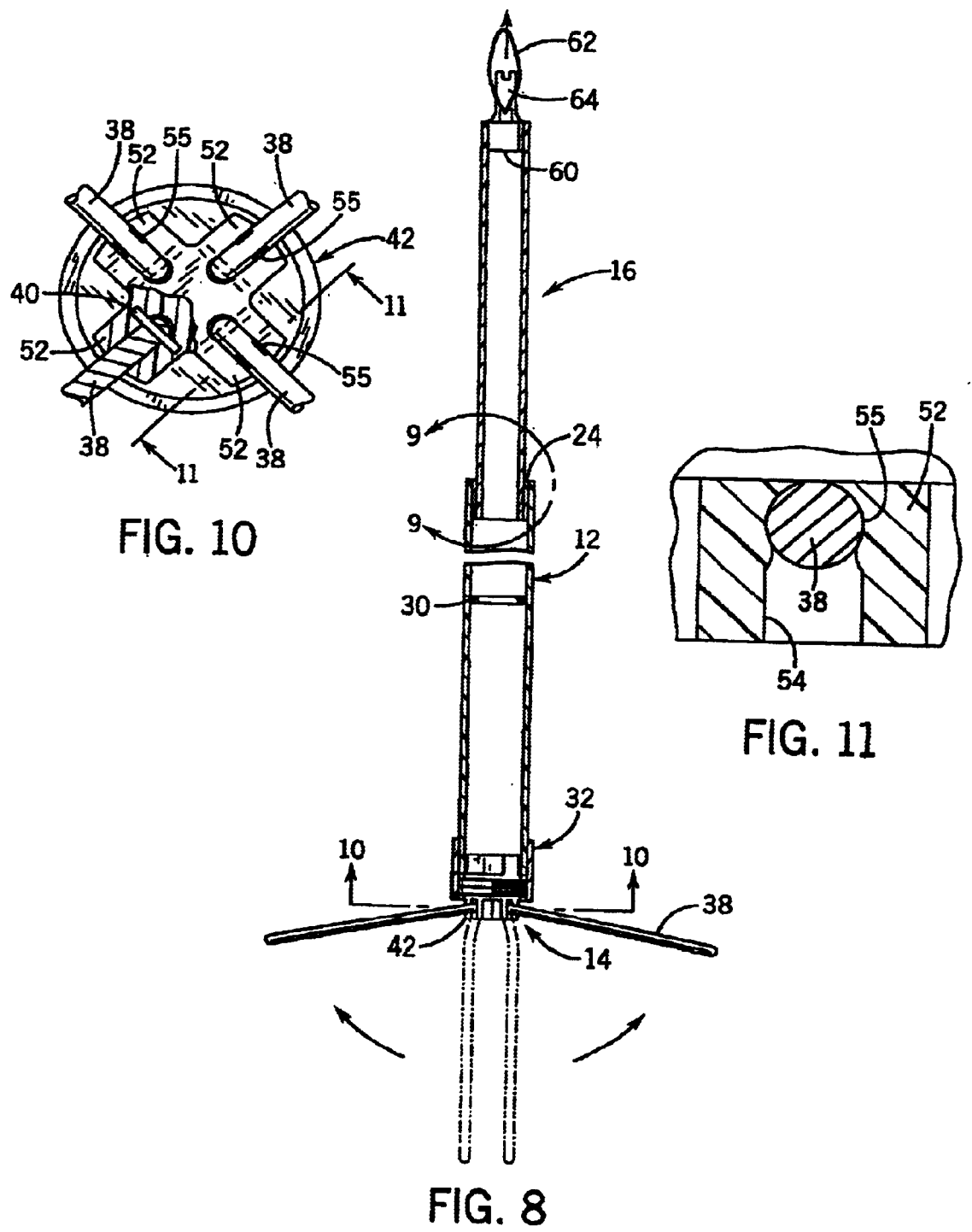

TIP DOWN ICE FISHING APPARATUS

FIELD OF THE INVENTION

This invention relates broadly to ice fishing apparatus and, more particularly, pertains to a self-contained system for supporting and encasing a fully assembled fishing rod in respective fishing and storage modes.

BACKGROUND OF THE INVENTION

The use of ice fishing equipment of known designs and configurations is well known in the prior art. More specifically, ice fishing equipment has been constructed and devised for the purpose of simplifying and improving the fishing process using methods and apparatuses consisting of familiar structural combinations having various features developed for satisfying a large number of objectives and requirements.

Among those ice fishing structures which have been used are U.S. Pat. No. 4,016,670 issued Apr. 12, 1977, U.S. Pat. No. 4,030,233 issued Jun. 21, 1977, U.S. Pat. No. 4,620,387 issued Nov. 4, 1986, U.S. Pat. No. 4,750,286 issued Jun. 14, 1985, U.S. Pat. No. 5,050,333 issued Sep. 24, 1991, U.S. Pat. No. 5,163,243 issued Nov. 17, 1992, U.S. Pat. No. 5,992,080 issued Nov. 30, 1999, U.S. Pat. No. 6,079,142 issued Jun. 27, 2000, and U.S. Pat. No. 6,094,852 issued Aug. 1, 2000.

When fishing with systems of the prior art, a fisherman is alerted of a fish taking his line by the fishing rod end tipping down towards the ice fishing hole which results from the line being pulled. While some of these designs may be folded or otherwise collapsed, none are known to enable self contained or protectively enclosed transport of a fully assembled ice fishing rod and a quick easy conversion to a fishing mode with a minimum of complexity. For those fisherman who carry a group of ice fishing rods, it is desirable to provide a system which will eliminate the common tangling of fishing lines during transport and set up.

Accordingly, it should be appreciated that there is a continued need for a differently constructed ice fishing apparatus which can be utilized to both conveniently support and store an ice fishing rod with a minimum of components and without tools of any kind.

SUMMARY OF THE INVENTION

It is one object of the present invention to provide a fishing rod container which is convertible to a fishing rod support for use while fishing.

It is also an object of the present invention to provide a self-contained ice fishing system having a set of collapsible and expandable legs.

It is a further object of the present invention to provide an ice fishing system which adequately protects and utilizes a fully assembled ice fishing rod.

It is an additional object of the present invention to provide a tip down ice fishing apparatus equipped with an optional mercury operated, light module for signaling the fisherman during periods of darkness.

It is another object of the present invention to provide an ice fishing system which has a vertically adjustable support for locating the fishing rod relative to an ice fishing hole.

Still another object of the present invention is to provide ice fishing equipment which is of a durable and reliable construction.

Yet a further object of the present invention is to provide an ice fishing system which is susceptible of a low cost of manufacture and sale.

Still a further object of the present invention is to provide a method of retaining an assembled fishing rod in a storage position and a fishing position adjacent a body of water.

In one aspect of the invention, a self-contained fishing system includes a telescopic, tubular fishing rod holder and support tower having an extendable and retractable upper end for pivotally supporting a fishing rod therefrom. Also included in the system is a cavity sized to contain a fishing rod in an assembled condition, and a set of movable legs in a retractable condition. A closure device is removably fastened to an open lower end of the holder and tower for supporting the fishing rod and the movable legs in a storage mode within the cavity. To define a fishing mode, with the upper end extended and the closure device detached, the fishing rod is removed from the cavity and pivotally supported on the upper end, and the legs are removed from the cavity, moved into an extended condition adapted to engage a solid support surface and the closure device is replaced such that the legs support the fishing rod holder and tower.

In another aspect of the invention, an ice fishing apparatus includes an outer tube having an open top end and an open bottom end provided with a removably attached closure device connected to a set of foldable legs movable from a storage position within the outer tube to a fishing position extending from beneath the bottom end upon removal, inversion and reattachment of the closure device. An inner tube has a closed upper end and an open lower end, the inner tube being telescopically mounted in the outer tube such that the inner tube moves between the storage position which is retracted within the top end of the outer tube, and the fishing position in which the upper end is extended from the top end of the outer tube and pivotally supports an assembled fishing rod thereon. The assembled fishing rod is held within the outer and inner tubes and surrounded by the foldable legs in the storage position. The top end of the outer tube includes a locking collar engagable with an upper groove on an outside surface of the inner tube when the inner tube is retracted, and with a lower groove on an outside surface of the inner tube when the inner tube is extended. An inside surface of the outer tube includes a first fixed stop for limiting the movement of the inner tube. An outside surface of the inner tube includes a second fixed stop engagable with the first fixed stop when the inner tube is retracted. The upper end of the inner tube is closed by means of a plug connected to a lanyard for pulling the inner tube when retracted. The top end of the inner tube includes a pair of upwardly extending head portions, each being formed with a downwardly depending notch structure for receiving a pivot pin extending through the fishing rod. The bottom end of the outer tube includes a coupling having internal threads. The closure device is comprised of a leg base having external threads engagable with the internal threads of the coupling. The closure device includes locking structure for holding the legs in the fishing position. The fishing rod has a pair of handles, one on each side of a spool with one of the handles having an extendable rod projecting therefrom. The fishing rod includes a counterweight outside the handle from which the rod projects. The fishing rod further includes a mercury operated, light module inserted in the other of the handles.

The invention also contemplates a method of retaining an assembled fishing rod in a storage position and a fishing position adjacent a body of water. The method includes the steps of providing a tubular, telescopic structure with a movable upper end and a closure device connected to a set of movable legs on a lower end for normally storing the assembled fishing rod and the movable legs in a collapsed condition therein; moving the upper end from a retracted position to an extended position to define a pivotal support for the fishing rod; removing the closure device to enable removal of the fishing rod from the storage position to the fishing position pivotally supported on the upper end of the telescopic structure, and to allow the legs to be moved to an expanded condition; and inverting and reattaching the closure device to the lower end of the telescopic structure such that the legs support the telescopic structure in the fishing position.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is an enlarged, cross-sectional view taken on line 3—3 of FIG. 2;

FIG. 4 is an enlarged, cross-sectional view taken on line 4—4 of FIG. 3;

FIG. 5 is an exploded view of the individual components of the ice fishing system, namely, a leg assembly, a fishing rod, and an inner tube telescopically mounted within an outer tube;

FIG. 6 is an enlarged, cross-sectional view taken on line 6—6 of FIG. 5;

FIG. 7 is an enlarged, cross-sectional view taken on line 7—7 of FIG. 6;

FIG. 8 is a view similar to FIG. 1 showing the fishing rod removed;

FIG. 9 is an enlarged detail view taken on line 9—9 of FIG. 8;

FIG. 10 is an enlarged cross-sectional view taken on line 10—10 of FIG. 8;

FIG. 11 is an enlarged cross-sectional view taken on line 11—11 of FIG. 10;

DETAILED DESCRIPTION OF THE INVENTION

Figure 1:
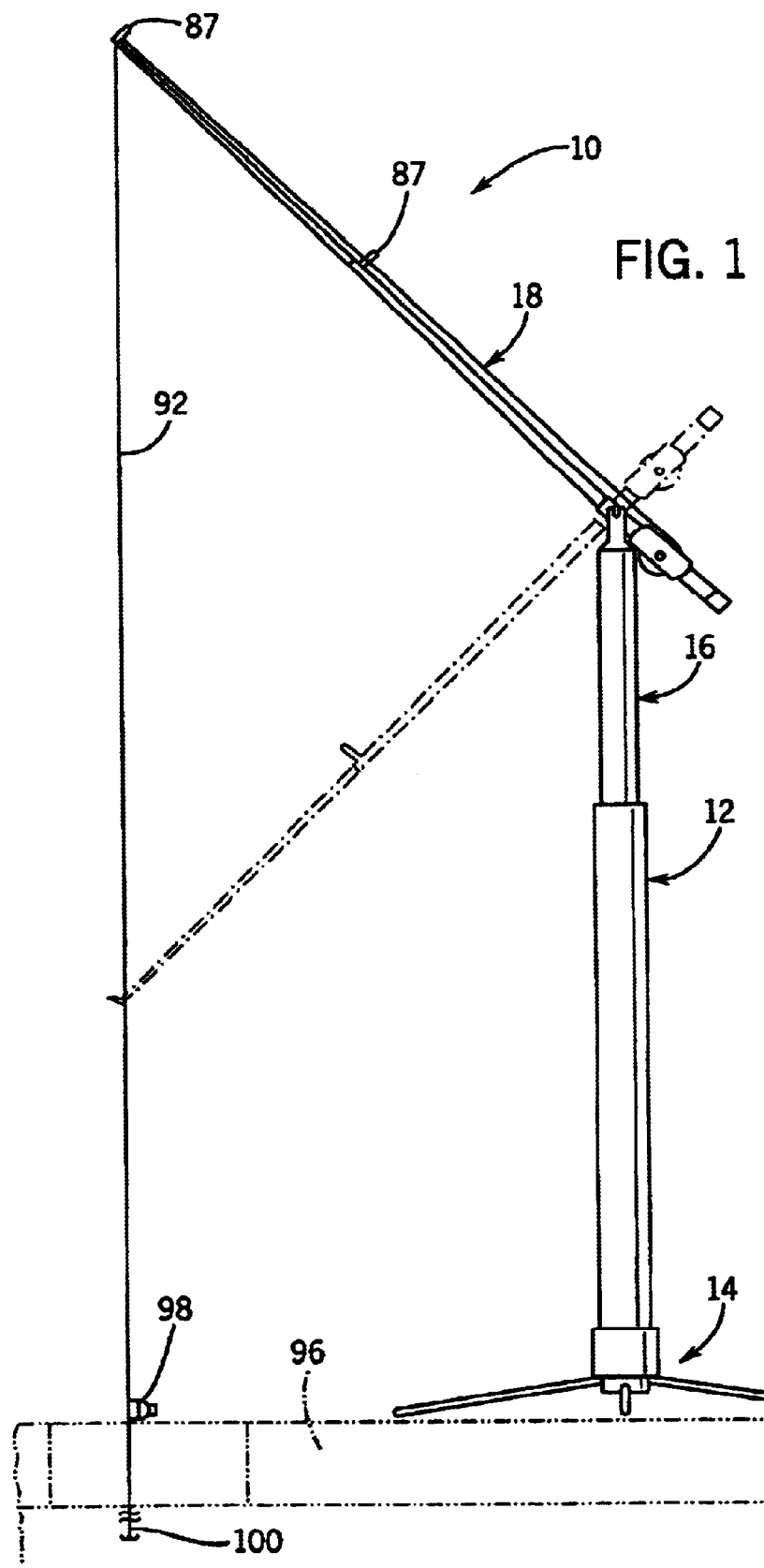
FIG. 1 is a front view of a self-contained ice fishing system embodying the present invention and shown in a fishing mode.

With reference to the drawings, there is shown the preferred embodiment of the fully assembled telescopic, tubular fishing rod holder and support tower/storage system and apparatus for ice fishing embodying the principles and concepts of the present invention, and generally designated by the reference numeral 10. Ice fishing system 10 is shown in a fishing mode in FIG. 1, and a storage mode in FIGS. 2 and 3.

In the present invention, the ice fishing system 10 is comprised of a combination of components. As seen in FIG. 5, such components in their broadest context include an outer tube 12, a foldable leg assembly 14, an inner tube 16 and a fully assembled ice fishing rod 18. Such components are individually configured and correlated with respect to each other so as to attain desired objectives described above.

As best seen in FIG. 6, outer tube 12 is an elongated, cylindrical, rigid member preferably constructed from plastic having an inner surface 20 and an outer surface 22. At an open top end of the outer tube 12 on the inner surface 20 is a locking collar 24, typically fabricated from plastic, which is used to lock the inner tube 16 in a retracted or expanded condition as will be further described hereafter. Collar 24 is generally cylindrically shaped and is formed with a plurality of downwardly depending fingers 26 around its periphery. The fingers 26 have inwardly projecting portions 28 at their bottom ends cooperable with groove structure on the inner tube 16. Beneath the midpoint of the outer tube 12 on the inner surface 20 is a cylindrical ring 30 of plastic which functions as a first fixed stop engagable with the lower end of the inner tube 16, also to be further described below. A generally cylindrical coupling 32 carrying an O-ring 34 for sealing purposes is attached to the outer surface 22 of the outer tube 12 at its open bottom end. Coupling 32 is provided with internal threads 36 for facilitating support of the leg assembly 14.

Turning to FIG. 5, the folding leg assembly 14 includes at least three and preferably four elongated support legs 38, preferably of aluminum, which are pivotally connected by pins 40 (FIG. 10) to a closure device in the form of a generally cylindrical leg base 42. The leg base 42 has a top portion 44 to which the legs 38 are movably attached, a bottom portion 46 and a medial portion 48 which is externally threaded at 50 to be screwed into and out of engagement with the internal threads 36 of coupling 32. In the storage mode illustrated in FIG. 3, the four legs 38 are folded upwardly so that they extend vertically into the lower half of outer tube 12. When the leg base 42 is manually unscrewed from coupling 32, the attached legs 38 are extracted from the outer tube 12, folded outwardly and locked by means of tabs 52 molded into the top portion of the leg base 42. More particularly, each tab 52 is formed with a contoured slot 54 (FIG. 11), the upper end 55 of which is frictionally engaged with a proximal end portion of each leg 38. Once the legs 38 have been folded and locked out, the leg base 42 is inverted and manually screwed back into the coupling 32 (FIG. 8). With the legs 38 expanded and extending externally from the bottom end of the outer tube 12, the legs 38 have been moved from the storage mode to a fishing mode to be further explained.

Referring to FIG. 6 again, inner tube 16 is an elongated, cylindrical rigid member also constructed from plastic having an internal surface 56 and an external surface 58. The inner tube 16 has a length which is shorter than that of the outer tube 12 and an outer diameter which is smaller than the inner diameter of the outer tube 12 so that it may be slidably and telescopically mounted therein. An upper end is closed by a plug 60 having a lanyard 62 connected to an apertured cylinder 63. The upper end of inner tube 16 has a pair of upwardly extending head portions 64, each being formed with a downwardly depending notch 66 used for supporting the fishing rod 18. The external surface 58 of inner tube 16 includes an upper lock groove 68 for locking the inner tube 16 in a retracted position in which the head portions 64 are disposed within the top end of the outer tube 12. A lower lock groove 70 is also formed on the external surface 58 for locking the inner tube 16 in an extended position (FIG. 8). At a lower end on the external surface 58 of the inner tube 16 is a second cylindrical ring which acts as a second fixed stop engagable with the bottom of the locking collar 24 on the outer tube 12 when the inner tube 16 is in the extended position. The ring 72 is also engagable with the first fixed stop 30 on the outer tube 12 when the inner tube 16 is in the retracted position. The inwardly projecting portions 28 on the locking collar fingers 26 are either engagable in a snap fit with the upper lock groove 68 when the inner tube 16 is retracted (FIG. 6), or with the lower lock groove 70 when the inner tube 16 is extended (FIG. 9). Also, as seen in FIG. 6, the lower portion of inner tube 16 is formed with a series of passages 74 to enable circulation of air between the outer tube 12 and the inner tube 16 (as depicted by the arrows) so that any condensation will not cause freezing of the tubes together. The air passages 74 generally allow the entire inner structure of the tubes 12, 16 to breathe.

Referring now to FIG. 5, the fishing rod 18 is fully assembled and includes an upper handle portion 76, a lower handle portion 78 and a spool holding portion 80 connecting the handle portions 76, 78. Each of the handle portions 76, 78 normally carries an end cap 82. The handle portions 76, 78 and spool holder 80 are deliberately sized so that they fit adequately in the center of and are surrounded by the four legs 38 as shown in FIG. 4. The upper handle portion 76 carries a horizontally disposed, stainless steel pivot pin 84 which is received in the notches 66 of inner tube head portion 64 so that the rod 18 will pivot therefrom. Extending from the upper handle portion 76 is a flexible rod 86, and preferably a telescopic rod, having an inner section 88 and an outer section 90. As seen in FIG. 1, a fishing line 92 extends from a plastic, spring loaded, slip clutch spool 94 rotatably mounted in the spool holder 80 along the rod 86 through eyelets 87 and then down to water in a hole formed in a support surface 96, such as ice. The line 92 commonly includes a bobber 98 and a hook 100 which is baited as desired. Although not shown, the invention contemplates that a handle could be included on the spool 94 to facilitate reeling in and/or paying out of line 92.

Figure 12:
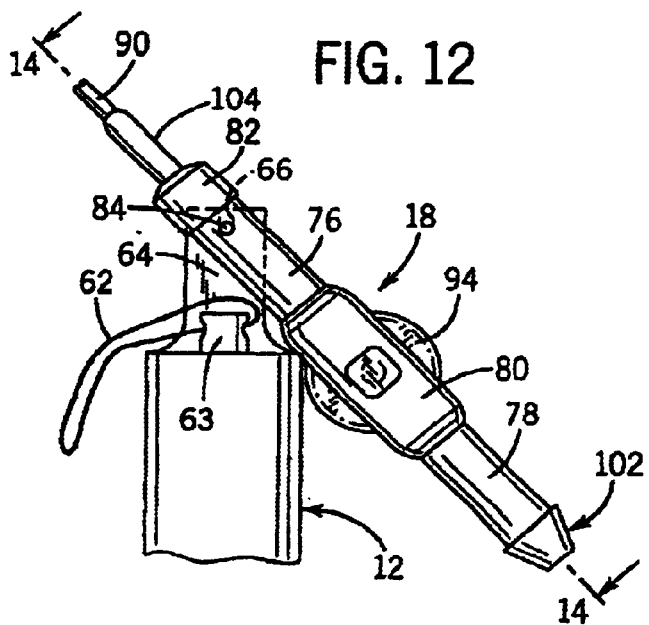
FIG. 12 is an enlarged partial front view of the fishing rod having an optional counterweight and mercury operated, light module.
Figure 13:
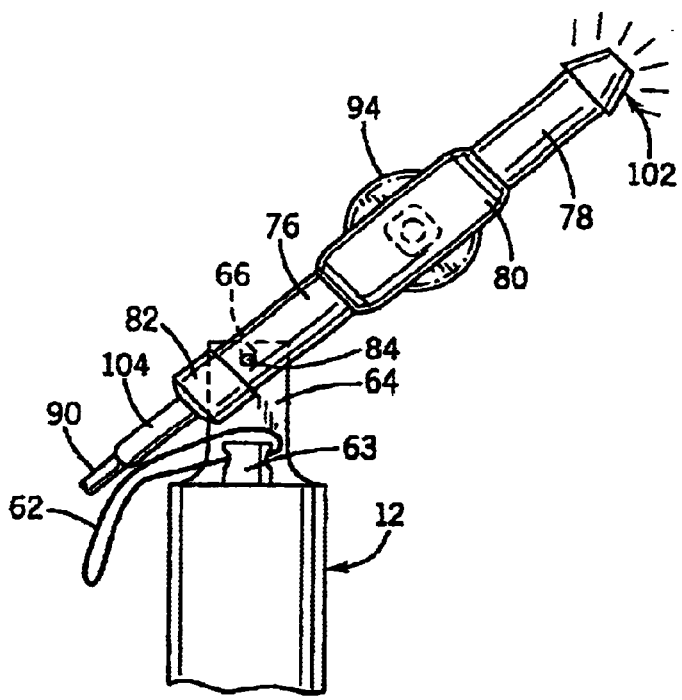
FIG. 13 is a view similar to FIG. 12 showing the actuation of the light module when the fishing rod tips down.
Figure 14:
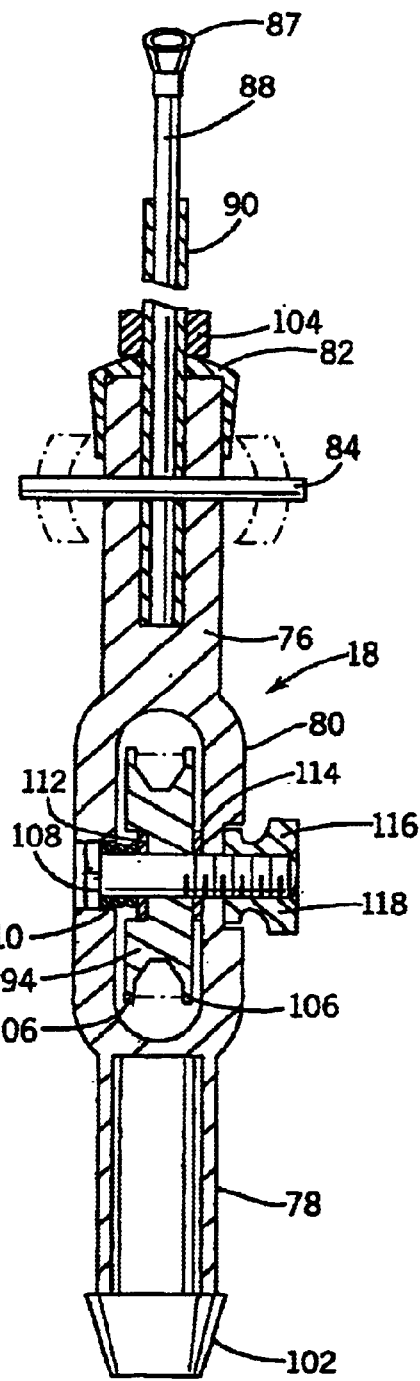
FIG. 14 is an enlarged cross-sectional view taken on line 14—14 of FIG. 12.

FIGS. 12 through 14 illustrate an optional fishing rod structure when the lower handle portion 78 is provided with a battery operated, light module 102 having a mercury switch arrangement or the like (not shown). The light module 102 is designed such that when the rod 18 moves from an up position (FIG. 12) to a down position (FIG. 13), the light module 102 will be used to visually indicate the strike of a fish during dark periods from dusk to dawn. A counterweight 104 is optionally installed on the lower end of the rod 18 adjacent the upper handle portions 76. FIG. 14 shows the details of the spool 94 used in both embodiments shown in the drawings. In particular, the spool 94 has a pair of knurled outer rims 106 for retaining fishing line in a line receiving groove formed therebetween. The spool 94 is rotatably mounted in its holder 80 by a headed bolt 108 which passes through aligned openings in the holder 80. A pressure spring 110 is interposed between the head of the bolt 108 and a first circular fiberglass, brake disc lying adjacent the inner face of one of the rims 106. A second circular fiberglass, brake disc 114 is disposed between the outer face of the outer rim 106 and the inside of the holder 80. An adjustment knob 116 is screwed onto a threaded end 118 of the head bolt 108.

Figure 2:
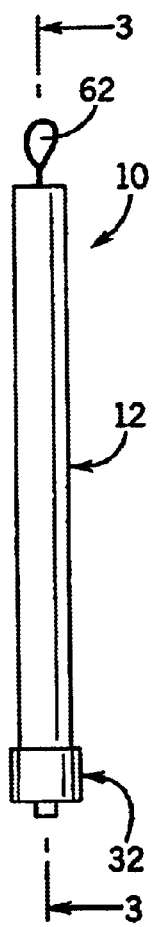
FIG. 2 is a front view of the ice fishing system of FIG. 1 shown in a storage mode.

In use, the ice fishing system 10 has a compact, lightweight storage mode as shown in FIGS. 2 and 3 wherein the inner tube 16 is retracted in outer tube 12, and wherein the legs 38 and fishing rod 18 are protectably retained within the outer and inner tubes 12, 16, respectively. In the storage mode, the outer tube 12 typically has a length of about 24 inches and a diameter of about two and one-eighth inches so that the system can be easily carried by the lanyard 62 or by grasping the outer tube 12 along its outer surface 22.

The system is made ready for the fishing mode by unscrewing the threaded leg base 42 with attached legs 38 from the outer tube coupling 32. This also removes the stored fishing rod 18 which is centered in the middle of the legs 38 and is further extracted therefrom. Once this has been done, the inner tube 16 is telescopically extended relative to the outer tube 12 by pulling on the lanyard 62 until the inner tube 16 locks into position with the locking collar fingers 26 engaging with the lower groove 70 on inner tube 16 (FIGS. 8 and 9). Extension of the inner tube 16 provides the system 10 with additional height (about 36.75 inches) to minimize bending over for the fisherman. Next, the leg base 42 is grasped and the four legs 38 are flipped out and locked as shown in FIGS. 10 and 11. The leg base 42 is then inverted and screwed back into the outer tube coupling 32, as shown in FIG. 10. The assembly is then positioned upon the ice 96 and the rod pivot pin 84 is placed in the notch structure 66 at the top of the inner tube 16 with the inner rod section 88 extended as depicted at FIG. 1. The fishing line 92 with its bobber 98 and hook 100 is then placed in a hole in the ice 96. If a heavy bait is used, a larger bobber 98 may be required to compensate for the added weight. The fisherman now sets the bait depth, baits the hook 100, positions the bobber 98 at water level and sets the rod 18 in the upward tilted position. With the bobber 98 at water level, any excess line is taken up by turning the spool 94. When the fish takes the bait, the rod 18 will tilt down until it reaches the downwardly tilted position shown in phantom lines of FIG. 1. The downwardly tilted position signals the fisherman that the fish has taken the bait. With the line tension lightly set, the fish takes as much line as necessary with the rod 18 downwardly tilted. The fisherman removes the fishing rod 18 from the top of the inner tube 16 and at any time sets the hook 100. By grasping the rod handle 76 or 78 and the spool 94 simultaneously, the hook 100 may be set without any loss of line 92. The fisherman then pulls on the line 92 and fish by hand, after which the fish is removed, the hook 100 is baited and fishing is resumed. When the fisherman is done fishing, the set up procedure described above is reversed so the system 10 again is placed in the storage mode.

If desired, the rod 18 can carry the counterweight 104 in advance of the upper handle portion 76. Also, for fishing in darker conditions, the optional light module 102 is used to provide a visual indication to the fisherman of a fish strike when the rod 18 pivots down as seen in FIG. 13.

It should be appreciated that the present invention provides a telescopic, tubular fishing rod holder and support/storage tower employing a minimum of parts and requiring less than a minute to convert the assembly from a storage mode to a fishing mode. The entire system is particularly durable, compact and easy to use by fishermen of any age.

While the preferred embodiment has been described as a self-contained fishing system particularly attracted for ice fishing, it should be further understood that the system 10 could also function as a rod support placed on a pier, a boat deck or other support surface adjacent a body of water.

Various alternatives and embodiments are contemplated as being within the scope of the following claims particularly pointing out and distinctly claiming the subject matter regarded as the invention.

I claim:

1. A self-contained fishing system comprising:

a telescopic, tubular fishing rod holder and support/storage tower storing a fully assembled fishing rod therein and having an upper end pivotally supporting the fishing rod above a solid support surface from a handle portion thereof, a cavity accessible from a bottom end of the fishing rod holder and support/storage tower and containing the fishing rod and holding a set of foldable, connected legs around the fishing rod and in a retractable condition, the fishing rod supporting upper end being extendable into and rectractable out of the cavity, and a closure device movably attached to the foldable legs, removably fastened to the bottom end of the fishing rod holder and support/storage tower and supporting the fully assembled fishing rod and foldable, connected legs in a storage mode within the cavity, wherein in the storage mode, the upper end is retracted within the cavity, and wherein to define a fishing mode, with the upper end extended and the closure device detached, the fishing rod is removed from the cavity and pivotally supported on the upper end, and the connected legs are removed from the cavity, and moved into an extended condition adapted to engage the solid support surface and the closure device is replaced such that the connected legs support the fishing rod holder and support/storage tower.

2. A method of retaining an assembled fishing rod in a storage position and a fishing position adjacent a body of water, the method comprising the steps of:

providing a tubular, telescopic fishing rod holder and support/storage tower with a movable upper end and a closure device movably attached to a set of foldable, connected legs and removably fastened on a lower end of the fishing rod holder and support storage tower which normally stores the assembled fishing rod and the foldable, connected legs in a collapsed condition surrounding the assembled fishing rod;

moving the upper end from a retracted position inside a cavity of the fishing rod holder and support/storage tower to an extended position outside the cavity of the fishing rod holder and support/storage tower to define a pivotal support for the assembled fishing rod;

removing the closure device to enable removal of the assembled fishing rod from the storage position via the lower end and transfer of the assembled fishing rod to the fishing position pivotally supported on the upper end of the telescopic structure, and to allow the foldable, connected legs to be folded out to an expanded condition; and inverting and reattaching the closure device to the lower end of the fishing rod holder and support storage tower such that the foldable, connected legs support the fishing rod holder and support/storage tower in the fishing position.

3. An ice fishing apparatus comprising:

an outer tube having an open top end and an open bottom end provided with a removably attached closure device connected to a set of foldable legs movable from a storage position within the outer tube to a fishing position extending from beneath the bottom end upon removal, inversion and reattachment of the closure device; and an inner tube having a closed upper end and an open lower end, the inner tube being telescopically mounted in the outer tube such that the inner tube moves between the storage position in which it is retracted within the top end of the outer tube, and the fishing position in which the upper end of the inner tube is extended from the top end of the outer tube and pivotally supports an assembled fishing rod thereon, the assembled fishing rod being held within the outer and inner tubes and surrounded by the foldable legs in the storage position, wherein the top end of the outer tube includes a locking collar engagable with an upper groove on an outside surface of the inner tube when the inner tube is retracted and with a lower groove on an outside surface of the inner tube when the inner tube is extended.

4. The apparatus of claim 3, wherein an inside surface of the outer tube includes a first fixed stop for limiting the movement of the inner tube.

5. The apparatus of claim 4, wherein an outside surface of the inner tube includes a second fixed stop engagable with the first fixed stop when the inner tube is retracted.

6. The apparatus of claim 3, wherein the upper end of the inner tube is closed by means of a plug connected to a lanyard for pulling the inner tube when retracted.

7. The apparatus of claim 6, wherein the upper end of the inner tube includes a pair of upwardly extending head portions, each being formed with a downwardly depending notch structure for receiving a pivot pin extending through the fishing rod.

8. The apparatus of claim 3, wherein the bottom end of the outer tube includes a coupling having internal threads.

9. The apparatus of claim 8, wherein the closure device is comprised of a leg base having external threads engagable with the internal threads of the coupling.

10. The apparatus of claim 3, wherein the closure device includes locking structure for holding the legs in the fishing position.

11. The apparatus of claim 3, wherein the fishing rod has a pair of handles, one on each side of a spool, one of the handles having an extendable rod projecting therefrom.

12. The apparatus of claim 11, wherein the fishing rod includes a counterweight outside of the handle from which the rod projects.

13. The apparatus of claim 12, wherein the fishing rod further includes a mercury operated, light module inserted in the other of the handles.

* * * * *